(12) United States Patent
Chung

(10) Patent No.: US 10,586,297 B2
(45) Date of Patent: Mar. 10, 2020

(54) LEARNING PROGRESS MONITORING SYSTEM

(71) Applicant: Hope Yuan-Jing Chung, Taichung (TW)

(72) Inventor: Hope Yuan-Jing Chung, Taichung (TW)

( * ) Notice: Subject to any disclaimer, the term of this patent is extended or adjusted under 35 U.S.C. 154(b) by 256 days.

(21) Appl. No.: 15/651,013

(22) Filed: Jul. 17, 2017

(65) Prior Publication Data

US 2018/0033106 A1   Feb. 1, 2018

(30) Foreign Application Priority Data

Jul. 26, 2016   (TW) .................................. 105123641

(51) Int. Cl.
| | |
|---|---|
| *G06Q 10/10* | (2012.01) |
| *G06Q 30/02* | (2012.01) |
| *G06Q 90/00* | (2006.01) |
| *G06Q 50/20* | (2012.01) |
| *G09B 7/00* | (2006.01) |
| *G09B 5/00* | (2006.01) |

(52) U.S. Cl.
CPC ............. *G06Q 50/205* (2013.01); *G09B 5/00* (2013.01); *G09B 7/00* (2013.01)

(58) Field of Classification Search
CPC ........... G06Q 50/205; G09B 5/00; G09B 7/00
USPC .................................................... 705/1.1–912
See application file for complete search history.

(56) References Cited

U.S. PATENT DOCUMENTS

| | | | |
|---|---|---|---|
| 7,828,552 B2 | 11/2010 | Shute et al. | |
| 2004/0202987 A1* | 10/2004 | Scheuring | G09B 7/02 434/118 |
| 2007/0122790 A1* | 5/2007 | Sperle | G09B 5/00 434/350 |
| 2008/0166693 A1* | 7/2008 | Gifford | G09B 7/00 434/322 |
| 2009/0035733 A1* | 2/2009 | Meitar | G09B 7/00 434/118 |
| 2010/0094886 A1* | 4/2010 | Krebs | G09B 7/00 707/758 |
| 2010/0190142 A1* | 7/2010 | Gal | G09B 5/00 434/322 |
| 2010/0223212 A1* | 9/2010 | Manolescu | G06Q 10/06 706/12 |

(Continued)

FOREIGN PATENT DOCUMENTS

TW        201322208 A      6/2013

*Primary Examiner* — Jonathan P Ouellette
(74) *Attorney, Agent, or Firm* — Alan D. Kamrath; Karin L. Williams; Mayer & Williams

(57) ABSTRACT

A learning progress monitoring system has an executing device, a server, and a plurality of monitoring devices. The server sets a learning goal according to a goal signal provided by the executing device, receives completion data via the executing device, and determines whether the number of approval signals from the monitoring devices reaches a satisfaction threshold. When the number of the approval signals reaches a satisfaction threshold, the server confirms that a stage of the learning goal is completed. If all the stages are completed before a target completion time, the server computes and stores N award points to an account corresponding to the executing device. The user of the executing device sets a goal of interest to learn and gains more motivation in learning through the awarding system.

12 Claims, 1 Drawing Sheet

(56) References Cited

U.S. PATENT DOCUMENTS

| | | | |
|---|---|---|---|
| 2012/0122066 A1 | 5/2012 | Dohring et al. | |
| 2013/0325665 A1* | 12/2013 | Shaffer | G09B 7/02 |
| | | | 705/26.61 |
| 2014/0272894 A1 | 9/2014 | Grimes et al. | |
| 2015/0056596 A1* | 2/2015 | Bercovitz | G09B 5/00 |
| | | | 434/350 |
| 2015/0199911 A1* | 7/2015 | Paramoure | G09B 5/00 |
| | | | 434/350 |
| 2015/0235561 A1* | 8/2015 | Lynch | G09B 5/02 |
| | | | 434/362 |
| 2016/0042661 A1* | 2/2016 | Minkoff | G09B 19/06 |
| | | | 434/157 |
| 2016/0180248 A1* | 6/2016 | Regan | G09B 5/00 |
| | | | 706/12 |
| 2017/0193847 A1* | 7/2017 | Ventrice | G09B 5/02 |
| 2017/0263144 A1* | 9/2017 | Horan | G09B 5/00 |
| 2018/0158347 A1* | 6/2018 | Sarafzade | G06Q 10/109 |

* cited by examiner

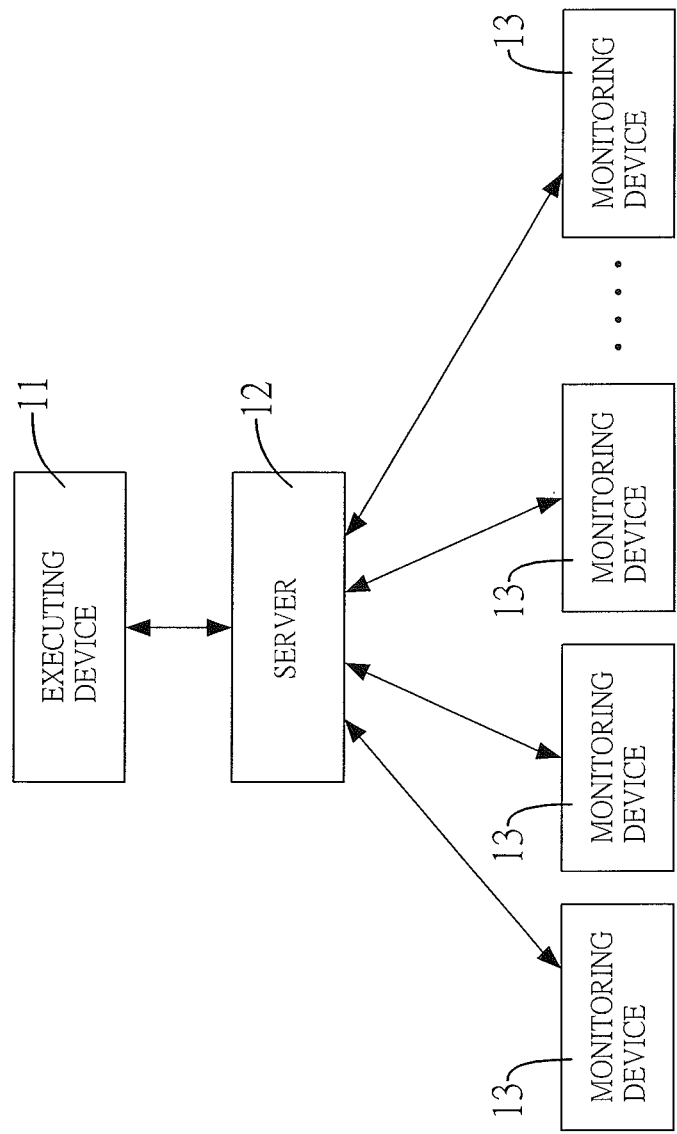

LEARNING PROGRESS MONITORING SYSTEM

BACKGROUND OF THE INVENTION

1. Field of the Invention

The invention relates to a monitoring system and, in particular, to a learning progress monitoring system.

2. Description of Related Art

Children usually learn things from teachers at school. A teacher chooses a topic for the class to guide the students into some subject. For example, a teacher may offer several story books for the class to choose one of interest for further study. The teacher may also directly select a specific story book for the class. During the class, the teacher tells the story to the students, with the assistance of voices, gestures, and movements according to the story. The teacher may also add a few words in another language for the children to learn the vocabulary simultaneously. Such a teaching method can better motivate the students in learning and achieve better effects.

Usually, the class is guided by a professional teacher. Homework is assigned to the students for them to do on their own, thereby assessing their learning progress. However, some children may not be interested in the stories offered by the teacher. In this case, not only are the students less motivated, but also the learning effect is worse. It is thus imperative to improve the current teaching method.

SUMMARY OF THE INVENTION

In view of the drawback that students are often less interested in the topics or instructions assigned by school teachers and intimidated by homework, thereby having little progress in learning, the invention provides a learning progress monitoring system. The learning progress monitoring system includes:

an executing device for outputting a goal signal, a stage number signal, and a completion time signal associated with a learning goal;

a server having a database and connecting to the executing device, the database storing an account associated with the executing device; wherein the server sets a goal and a target completion time according to the goal signal, the stage number signal, and the completion time signal and programs the learning goal into multiple stages according to the stage number signal; wherein the server receives completion data corresponding to one stage of the goal output from the executing device; and a plurality of monitoring devices connected to the server and receiving the completion data.

The server determines whether any of the monitoring devices outputs an approval signal. When the monitoring device outputs the approval signal, the server determines whether the number of the approval signals reaches a satisfaction threshold.

When the number of the approval signals received reaches the satisfaction threshold, the server confirms that the stage corresponding to the completion data is accomplished. The server further determines whether all the stages associated with the goal are completed.

When all the stages of the goal are completed, the server determines whether the current time reaches the target completion time. If the current time is before the completion time, the server computes a number of award points N and stores the N award points to the account.

With the learning progress monitoring system, the executing device enables its learner to set a goal. Each of the monitoring devices is controlled by an evaluator to output the approval signal. The server determines whether the monitoring devices output the approval signals. When the server determines that the number of the received approval signals reaches the satisfaction threshold, the stage corresponding to the completion data is completed. The server moves on to the next stage. The executing device re-uploads new completion data for the next stage. The server continues to determine whether the monitoring devices output the approval signals, and if the number of the received approval signals reaches the satisfaction threshold, this process is repeated until all the stages of the goal are considered to be completed. Finally, the server further determines whether the current time is before or after the target completion time. If the current time is before the completion time, it means that the learner completes the goal in time. The server then stores the N award points to the account corresponding to the executing device, awarding the learner for completing the goal.

Setting a goal via the executing device, the learner can set a goal of interest to learn. This avoids the problem of low learning progress due to uninterested topics. Besides, the learner is motivated by gaining certain awards after completing a goal. This can increase the efficiency in learning.

BRIEF DESCRIPTION OF THE DRAWING

FIG. 1 is a block diagram of the learning progress monitoring system of the present invention.

DETAILED DESCRIPTION OF THE PREFERRED EMBODIMENT

As shown in FIG. 1, the learning progress monitoring system includes an executing device 11, a server 12, and a plurality of monitoring devices 13.

The executing device 11 is configured to receive a goal signal, a stage number signal, and a completion time signal input by a learner. The executing device 11 in this embodiment is a computer. Each of the monitoring devices 13 may be a mobile device, a laptop computer, a tablet computer, or a desktop computer.

The server 12 has a database and is connected to the executing device 11. The database stores data of an account, which corresponds to the executing device 11. The server 12 sets a goal and a target completion time according to the goal signal, the stage number signal, and the completion time signal supplied by the executing device 11. The server 12 programs the goal into a plurality of stages according to the stage number signal. The executing device 11 receives and transmits completion data to the server 12, wherein the completion data corresponds to one of the stages within the goal.

Each of the monitoring devices 13 is connected to the server 12 and reads the completion data.

The server 12 determines whether each of the monitoring devices 13 outputs an approval signal. When the monitoring devices 13 output the approval signals, the server 12 determines whether the number of approval signals received reaches a satisfaction threshold.

When the number of approval signals reaches the satisfaction threshold, the server 12 confirms that the stage corresponding to the completion data is accomplished and determines whether other stages within the goal are all accomplished. When the number of approval signals does not reach the satisfaction threshold, the server 12 may continue to determine whether each of the monitoring devices 13 outputs an approval signal.

When any of the stages within the goal is not completed, the executing device 11 receives and transmits new completion data to the server 12 and clears all approval signals. The server 12 re-determines whether each of the monitoring devices 13 outputs an approval signal. The new completion data corresponds to the stage within the goal that is not completed yet.

When the stages within the goal are all completed, the server 12 further determines whether the current time is before or after the target completion time. If the current time is before the target completion time, the server 12 computes an award point number N and stores the N award points to the account. If the current time is after the target completion time, the server 12 stores no award point to the account.

The learning progress system sets the goal through the executing device 11, which is determined and operated by the learner. The completion of each stage within the goal is determined according to the total number of the approval signals output by the monitoring devices 13. Each of the monitoring devices 13 is controlled by a respective evaluator to generate the approval signal.

After the executing device 11 transmits the completion data and the number of the approval signals output by the monitoring devices is found to reach the satisfaction threshold, it means that the stage corresponding to the completion data is accomplished. The system then proceeds to the next stage of the goal. This process is repeated until all the stages within the goal are accomplished. The server 12 further determines whether the current is before or after the target completion time. If the current time is before the target completion time, it means that the goal is accomplished within the time limit. The N award points are then stored to the account, thereby recognizing the efforts made by the learner on the executing device 11. Since the server 12 uses the number of approval signals output from the monitoring devices 13 to determine whether a stage of the goal is completed, the learner on the executing device 11 is prevented from having influences on the evaluator of any particular monitoring device 13, avoiding misguiding the evaluator to wrongly consider the stage completed because the monitoring device 13 receives the approval signal.

As the goal is set by the learner of the executing device 11, the learner can choose a goal of interest to learn. This avoids the problem of learning an uninteresting topic and having little progress. Besides, the learner may obtain certain awards after completing the goal, thereby keeping the learner motivated in learning with efficiency.

For example, the executing device 11 sets the goal of learning 100 Chinese characters in one month, with the stage number signal set as 4. The server 13 partitions the goal of learning 100 Chinese characters in one month into 4 stages. In other words, each stage involves learning 25 Chinese characters. When the executing device 11 receives first completion data input by the learner, it means that the learner on the executing device 11 accomplishes the first stage of learning 25 Chinese characters. The first completion data can be audio/video (AV) data recorded by the learner. Each of the monitoring devices 13 is operated by the corresponding evaluator to output the approval signal when the evaluator agrees that the learner on the executing device 11 indeed accomplishes the first stage of learning according to the completion data uploaded by the learner. When the server 12 detects the reception of approval signals and determines that the number of the received approval signals reaches a satisfaction threshold, it means that the learner on the executing device 11 is considered to complete the first stage of the goal. The server 12 thus confirms the completion of the first stage of the goal.

Afterwards, the executing device 11 may receive a next completion data of the next stage, and the server 12 determines whether the next stage of the goal is completed as described above. The foregoing process is repeated from the first stage to the final stage, i.e. the fourth stage. When all the stages are considered to be completed, it means that the learner on the executing device 11 has achieved the goal of learning 100 Chinese characters. Afterwards, the server 12 determines whether the time when all the stages of the goal are completed is within the target completion time, i.e. a month. If so, it means that the learner of the executing device 11 indeed achieves the goal of learning 100 Chinese characters on schedule. The server 12 then computes an award point number N, and stores the N award points to the account associated with the executing device 11, thereby recognizing the efforts of the learner of the executing device 11.

The accumulated award points may be further used to exchange for prizes. For example, the award points can be used to exchange drinks, desserts or stationeries. Through such an award system, the learner on the executing device 11 is encouraged to learn with efficiency.

In one embodiment, the satisfaction threshold is 5. That is, once 5 or more of the monitoring devices 13 output the approval signals, the stage corresponding to the completion data is considered completed. The number of award points N is (satisfaction threshold)×(stage number signal). For example, suppose the stage number signal is 4 and the satisfaction threshold is 5. When the learner of the executing device 11 completes all the stages of the goal within the target completion time, the learner may obtain 5×4=20 award points.

Furthermore, when determining whether each of the monitoring devices 13 outputs an approval signal, the server 12 further determines whether each of the monitoring devices 13 outputs at least one suggested award point. If the monitoring devices 13 output at least one suggested award point, the server computes the number of award points N as (the total number of suggested award points)+(satisfaction threshold)×(stage number signal). That is, when receiving the approval signal, each of the monitoring devices 13 can also give at least one suggested award point at the same time. This mechanism can increase the award points received by the learner of the executing device 11 while completing all the stages of the goal, thereby further encouraging the learner to complete the goal.

Moreover, after computing the number of award points N and storing the N award points to the account, the server 12 further stores a level medal to the account according to the total number of the satisfaction award points. In one embodiment of the invention, the level medal includes three levels, corresponding to different numbers of total satisfaction award points. For example, when the total number of satisfaction award points is between 5 and 9, the server 12 stores a first-level medal to the account. When the total number of satisfaction award points is between 10 and 14, the server 12 stores a second-level medal to the account. When the total number of satisfaction award points is above 15, the server 12 stores a third-level medal to the account.

The level medal stored in the account represents the difficulty of the current goal. When a more difficult goal is completed, not only can the learner get more award points, but also a higher-level medal can be awarded for encouragement. Besides, better prizes can only be exchanged using higher-level medals. This mechanism encourages the learner of the executing device 11 to voluntarily increase the difficulty of the goal.

When detecting that the monitoring devices 13 output the approval signals, the server 12 further receives a level signal accompanying the approval signals from the monitoring devices 13. When computing the number of award points N, the server 12 further determines whether the total number of the suggested award points is less than a threshold. When the total number of suggested award points is less than the threshold, the server 12 stores a level medal corresponding to the level signal to the account.

As a result, the monitoring devices 13 can provide the level signal while outputting the approval signals to the server 12, thereby determining the difficulty of the current goal. The server 12 follows the level signal to store the corresponding level medal to the account. This mechanism also encourages the learner of the executing device 11 to increase the difficulty of the goal.

Moreover, when determining whether the approval signals are received, the server 12 also determines whether a protest signal is received. When a protest signal is received, the server 12 will increase the satisfaction threshold. Therefore, if the learner of the executing device 11 wants to affect the evaluator of any of the executing devices 13, other evaluators of other monitoring devices 13 can send the protest signal if there is any concern. Once any of the monitoring devices 13 issues the protest signal, the server 12 increases the satisfaction threshold to increase the difficulty of the stage. This mechanism can avoid cheating or unfair evaluations.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A learning progress monitoring system, comprising:
   an executing device for outputting a goal signal, a stage number signal, and a completion time signal associated with a learning goal;
   a server having a database and connecting to the executing device, the database storing an account associated with the executing device; wherein the server sets a goal and a target completion time according to the goal signal, the stage number signal, and the completion time signal and programs the learning goal into multiple stages according to the stage number signal; wherein the server receives completion data corresponding to one stage of the goal output from the executing device; and
   a plurality of monitoring devices connected to the server and receiving the completion data;
   wherein each of the plurality of monitoring devices is controlled by a respective evaluator to generate an approval signal and the server detects whether any of the monitoring devices outputs an approval signal, wherein when the monitoring devices output the approval signals, the server determines whether the number of the approval signals from the plurality of monitoring devices has reached a satisfaction threshold;
   wherein the server confirms that the stage corresponding to the completion data is accomplished when the number of the approval signals corresponding to the stage reaches the satisfaction threshold and determines whether all the stages of the learning goal are completed;
   wherein when any stage of the goal is not completed yet, the executing device outputs new completion data corresponding to a stage not completed yet and transmits the new completion data to the server and clears all the approval signals in the server, and the server re-detects whether any of the monitoring devices outputs a new approval signal for the new completion data; and
   wherein the server determines whether a current time that all the stages of the learning goal are completed exceeds the target completion time and, when the current time is before the target completion time, the server computes a number of award points N and stores the N award points to the account, while storing no award point to the account when the current time is after the target completion time.

2. The learning progress monitoring system of claim 1, wherein the server uses a first formula to compute the N award points:

$$N=A \times B;$$

where A is the satisfaction threshold and B is the stage number signal.

3. The learning progress monitoring system of claim 1, wherein the server further determines whether at least one suggested award point is received while detecting whether any of the monitoring devices outputs the approval signal and, when at least one suggested award point is received, the server computes the N award points according to a second formula:

$$N=C+A \times B;$$

where A is the satisfaction threshold, B is the stage number signal, and C is the number of the at least one suggested award point.

4. The learning progress monitoring system of claim 3, wherein after computing the number of award points N and storing the N award points to the account, the server further stores a level medal corresponding to the number of the suggested award points to the account.

5. The learning progress monitoring system of claim 4, wherein there are three levels of the level medals, and the server stores the level medals of different levels to the account corresponding to the number of the at least one suggested award point.

6. The learning progress monitoring system of claim 3, wherein the server further receives a level signal accompanying the approval signal via the monitoring device;
   wherein when the sever computes the number of the award points N, the server further determines whether the number of the at least one suggested award point is smaller than a threshold value; and when the number of the at least one suggested award point is smaller than the threshold value, the server stores a level medal corresponding to the level signal to the account.

7. The learning progress monitoring system of claim 1, wherein the server determines whether a protest signal is received while detecting whether the monitoring devices output the approval signals; and the server increases the satisfaction threshold when the protest signal is received.

8. The learning progress monitoring system of claim 2, wherein the server determines whether a protest signal is received while detecting whether the monitoring devices output the approval signals; and the server increases the satisfaction threshold when the protest signal is received.

9. The learning progress monitoring system of claim 3, wherein the server determines whether a protest signal is received while detecting whether the monitoring devices output the approval signals; and the server increases the satisfaction threshold when the protest signal is received.

10. The learning progress monitoring system of claim 4, wherein the server determines whether a protest signal is received while detecting whether the monitoring devices output the approval signals; and the server increases the satisfaction threshold when the protest signal is received.

11. The learning progress monitoring system of claim 5, wherein the server determines whether a protest signal is received while detecting whether the monitoring devices output the approval signals; and the server increases the satisfaction threshold when the protest signal is received.

12. The learning progress monitoring system of claim 6, wherein the server determines whether a protest signal is received while detecting whether the monitoring devices output the approval signals; and the server increases the satisfaction threshold when the protest signal is received.

* * * * *